(12) United States Patent
Chang et al.

(10) Patent No.: US 11,143,817 B2
(45) Date of Patent: *Oct. 12, 2021

(54) SEMICONDUCTOR STRUCTURE AND MANUFACTURING METHOD OF THE SAME

(71) Applicant: TAIWAN SEMICONDUCTOR MANUFACTURING COMPANY LTD., Hsinchu (TW)

(72) Inventors: Yung-Chang Chang, Taipei (TW); Chung-Yen Chou, Hsinchu (TW); Ming-Chyi Liu, Hsinchu (TW); Shih-Chang Liu, Kaohsiung County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,935

(22) Filed: Nov. 13, 2019

(65) Prior Publication Data

US 2020/0081185 A1 Mar. 12, 2020

Related U.S. Application Data

(63) Continuation of application No. 15/875,577, filed on Jan. 19, 2018, now Pat. No. 10,509,169.

(60) Provisional application No. 62/579,046, filed on Oct. 30, 2017.

(51) Int. Cl.
*G02B 6/136* (2006.01)
*G02B 6/124* (2006.01)
*G02B 6/122* (2006.01)
*G02B 6/12* (2006.01)

(52) U.S. Cl.
CPC ......... *G02B 6/136* (2013.01); *G02B 6/12002* (2013.01); *G02B 6/124* (2013.01); *G02B 6/1228* (2013.01); *G02B 2006/12061* (2013.01); *G02B 2006/12107* (2013.01); *G02B 2006/12195* (2013.01)

(58) Field of Classification Search
CPC .................... G02B 6/136; G02B 2006/12107
See application file for complete search history.

(56) References Cited

U.S. PATENT DOCUMENTS

| 9,002,156 B2* | 4/2015 | Ellis-Monaghan .... G02B 6/122 385/14 |
| 10,509,169 B2* | 12/2019 | Chang ................ G02B 6/12002 |
| 2003/0190772 A1* | 10/2003 | Toyota .................... H01J 9/025 438/200 |
| 2012/0252155 A1* | 10/2012 | Choi .................. H01L 27/14683 438/70 |
| 2013/0015546 A1* | 1/2013 | Joe ......................... G02B 6/124 257/432 |

(Continued)

*Primary Examiner* — Omar R Rojas
(74) *Attorney, Agent, or Firm* — WPAT, P.C.; Anthony King

(57) ABSTRACT

A semiconductor structure is disclosed. The semiconductor structure includes: a substrate and a gate element over the substrate. The gate element includes: a gate dielectric layer over the substrate; a gate electrode over the gate dielectric layer; and a waveguide passing through the gate electrode from a top surface of the gate electrode to a bottom surface of the gate electrode. A manufacturing method of the same is also disclosed.

20 Claims, 9 Drawing Sheets

(56) References Cited

U.S. PATENT DOCUMENTS

2016/0349469 A1* 12/2016 Kase .................... G02B 6/4214

* cited by examiner

SEMICONDUCTOR STRUCTURE AND MANUFACTURING METHOD OF THE SAME

CROSS REFERENCE TO RELATED APPLICATIONS

This application is a continuation of application Ser. No. 15/875,577, filed on Jan. 19, 2018, which claims the benefit of U.S. provisional application 62/579,046, filed on Oct. 30, 2017, which is incorporated by reference in its entirety.

BACKGROUND

The semiconductor integrated circuit (IC) industry has experienced exponential growth. Technological advances in IC design and material have produced generations of ICs where each generation has smaller and more complex circuits than previous generation. In the course of IC evolution, functional density (i.e., the number of interconnected devices per chip area) has generally increased while geometry size (i.e., the smallest component (or line) that can be created using a fabrication process) has decreased.

Manufacturing of waveguide structure has experienced exponential growth. The waveguide structures have attracted a lot of attentions because of its process availability and manufacturing feasibility. In general, a light is confined in the waveguide structure by a total internal reflection from the waveguide walls. However, the manufacturing of the waveguide structure has challenges.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. Specifically, dimensions of the various features may be arbitrarily increased or reduced for clarity of discussion.

DETAILED DESCRIPTION

Figure 1:
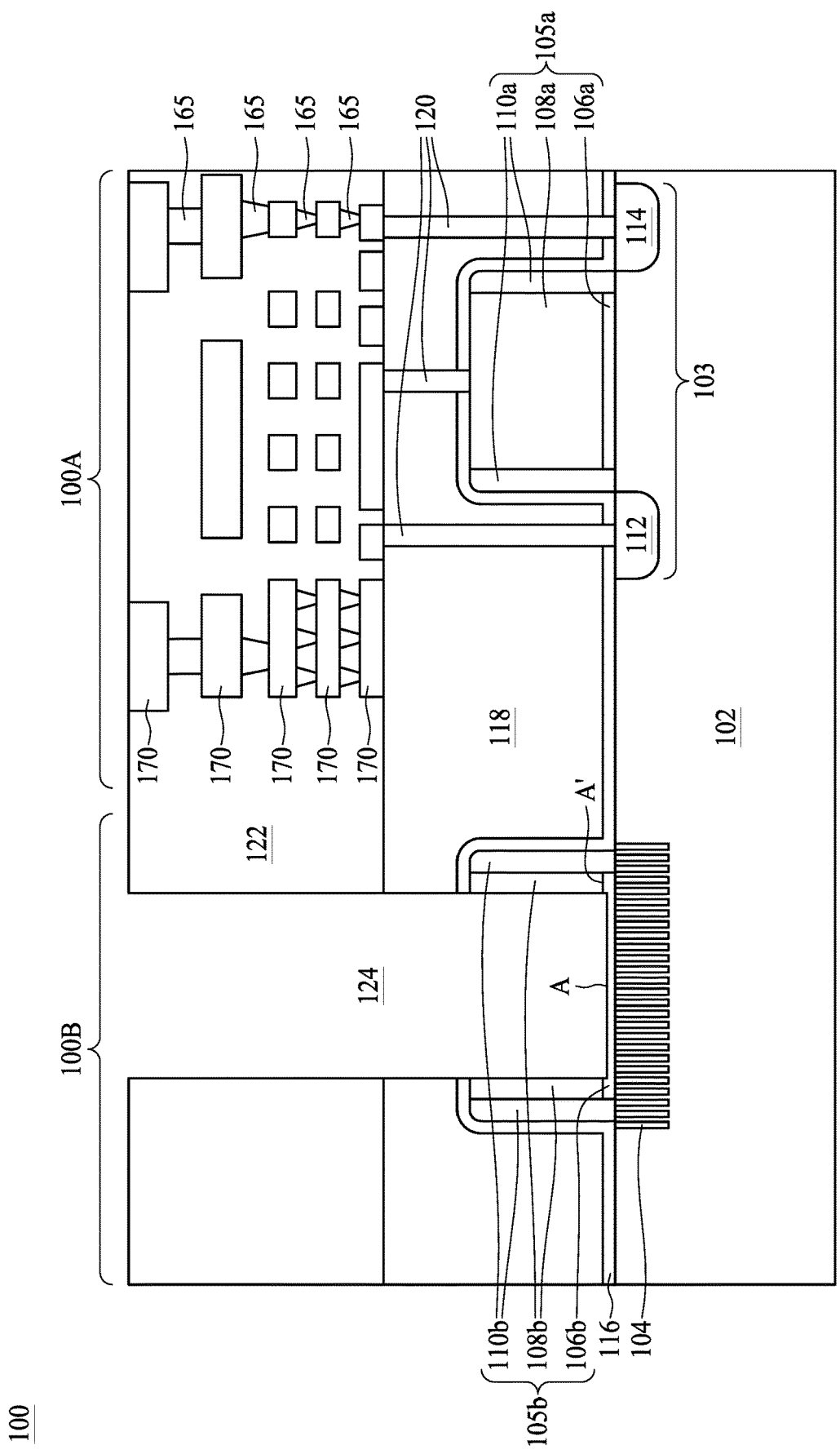
FIG. 1 is a diagrammatic fragmentary cross-sectional view of a semiconductor device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments and configurations discussed.

Further, spatially relative terms, such as "beneath," "below," "lower," "above," "upper" and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating or working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A semiconductor device including a waveguide structure and the methods of forming the same are provided in accordance with an embodiment of the present disclosure. The intermediate stages of manufacturing the semiconductor device are illustrated. Variations of the embodiments are also discussed. Throughout the various views and illustrative embodiments, like reference numbers are used to designate like elements.

FIG. 1 is a diagrammatic fragmentary cross-sectional view of a semiconductor device 100 in accordance with various embodiments of the present disclosure. As shown in FIG. 1, the semiconductor structure 100 may include a logic region 100A and a waveguide region 100B. The logic region 100A includes a circuit component 103 is formed on a semiconductor substrate 102; and the waveguide region 100B includes a grating coupler structure 104 formed in the semiconductor substrate 102. A plurality of layers of ILD (inter level dielectric, also known as pre-metal dielectric or inter-metal dielectric) material 122 may be formed over the semiconductor substrate 102 at both the logic region 100A and the waveguide region 100B.

The semiconductor substrate 102 may be a bulk silicon substrate. Alternatively, the semiconductor substrate 102 may be comprised of an elementary semiconductor, such as silicon or germanium in a crystalline structure; a compound semiconductor, such as silicon germanium, silicon carbide, gallium arsenic, gallium phosphide, indium phosphide, indium arsenide, and/or indium antimonide; or combinations thereof. The semiconductor substrate 102 may also include a silicon-on-insulator (SOI) substrate. SOI substrates are fabricated using separation by implantation of oxygen (SIMOX), wafer bonding, and/or other suitable methods. Some exemplary semiconductor substrate 102 includes an insulator layer. The insulator layer may be comprised of any suitable material, including silicon oxide, sapphire, other suitable insulating materials, and/or combinations thereof. An exemplary insulator layer may be a buried oxide layer (BOX). The insulator may be formed by any suitable process, such as implantation (e.g., SIMOX), oxidation, deposition, and/or other suitable process.

The semiconductor substrate 102 may include various doped regions depending on design requirements as known in the art (e.g., p-type wells or n-type wells). The doped regions are doped with p-type dopants, such as boron or $BF_2$; n-type dopants, such as phosphorus or arsenic; or combinations thereof. The doped regions may be formed directly on the semiconductor substrate 102, in a P-well structure, in an N-well structure, in a dual-well structure, or using a raised structure. The semiconductor substrate 102 may further include various active regions, such as regions configured for an N-type metal-oxide-semiconductor transistor device and regions configured for a P-type metal-oxide-semiconductor transistor device.

In the exemplary embodiment, the circuit component 103 of the logic region 100A is depicted as a transistor having a gate element 105a and source/drain regions 112 and 114 formed in the semiconductor substrate 102. The gate element 105a includes a gate dielectric 106a on a surface of semiconductor substrate 102. The gate dielectric 106a may preferably be oxide. In another embodiment, silicon nitride is used since it is an effective barrier to impurity diffusion. In other embodiments, the gate dielectric 106a may also be an oxy-nitride, an oxygen-containing dielectric, a nitrogen-containing dielectric or any combination thereof.

The gate element 105a further includes a gate electrode 108a formed on the gate dielectric 106a. The gate electrode 108a is preferably polysilicon. The polysilicon has the ability of being used as a mask to achieve minimum gate-to-source/drain overlap. This in turn enhances the device performance. The polysilicon is then doped to reduce the sheet resistance.

The gate element 105a further includes a pair of spacers 110a formed along sidewalls of the gate dielectric 106a and the gate electrode 108a. The spacers 110a serve as self-aligning masks for a salicidation process. The spacer material can be oxide, silicon nitride, oxy-nitride or any combination thereof.

At the waveguide region, an opening 124 penetrates through the plurality of layers of ILD material 122 and deeply into a gate element 105b neighboring to the gate element 105a, therefore an outer portion of the gate element 105b shows in FIG. 1. In some embodiments, the grating coupler structure 104 is beneath the opening 124 and abutting a top surface of the semiconductor substrate 102. The grating coupler structure 104 includes one of a metal, such as copper or aluminum, or a high dielectric material. In some embodiments, the grating coupler structure 104 includes several segments with a distance between each segment. In particular, the grating coupler structure 104 have a rectangular array shape with a thickness ranging from about 20 nm to 200 nm for coupling a laser signal passing through the opening 124. In some embodiments, the grating coupler structure 104 has a grating pitch ranging from about 20 nm to 800 nm. In some embodiments, the grating pitch of the grating coupler structure 104 is greater than the critical dimension (CD) of the process, and the CD is about 30% of the grating pitch. In some embodiments, the grated coupler structure 104 transforms the laser signal into modulated light signal.

The outer portion of the gate element 105b surrounds a lower portion of the opening 124. The outer portion of the gate element 105b includes a gate dielectric 106b, a gate electrode 108b and a pair of spacers 110b. Materials of the gate dielectric 106b, the gate electrode 108b and the pair of spacers 110b is substantially the same or similar to the gate dielectric 106a, the gate electrode 108a and the pair of spacers 110a respectively.

In according with an aspect of the present disclosure, the gate element 105b is advantageous for profile control when etching the opening 124 in the waveguide region 100B. In some embodiments, the opening 124 may be used as a light path or waveguide to introduce light to the grating coupler structure 104. In the exemplary embodiment, the opening 124 has a rectangular profile with two parallel sidewalls perpendicular to a top surface of the semiconductor substrate 102.

The outer portion of the gate element 105b is over the grating coupler structure 104. In particular, the outer portion of the gate element 105b, including the gate dielectric 106b, the gate electrode 108b and the pair of spacers 110b, fully overlaps the grating coupler structure 104 from a top view. Therefore, the opening 124 as well fully overlaps the grating coupler structure 104 from the top view. As can be seen from the cross-sectional view of a semiconductor device 100, the gate electrode 108b includes two elongated rectangular profiles respectively abutting a left sidewall and a right sidewall of the opening 124. In the exemplary embodiment, the opening 124 is unfilled (i.e. filled with air) and the gate electrode 108b is exposed through sidewalls of the opening 124. However, this is not a limitation of the present disclosure. In some embodiments, the opening 124 is filled with a waveguide material selected for providing a high reflectivity to a selected radiation type/wavelength. For example, the waveguide material may include polyimide, epoxy, polymer, dielectric material, and the like.

The gate dielectric 106b is located around a bottom surface A of the opening 124. A width of the bottom surface A is narrower than a width of the gate dielectric 106b. The bottom surface A of the opening 124 may be level with or even lower than a bottom surface A' of the gate electrode 108b. In the case where the bottom surface A is level with the bottom surface A', the gate dielectric 106b includes a rectangular profile beneath the opening 124, and a portion of the gate dielectric 106b is exposed and regarded as the bottom surface A of the opening 124. FIG. 1 shows the case where the bottom surface A is lower than the bottom surface A', the gate dielectric 106b has a rectangular profile with a recessed portion at an upper center of the rectangular profile. The recessed portion of the gate dielectric 106b is exposed through the opening 124. A bottom surface of the recessed portion is therefore regarded as the bottom surface A of the opening 124; and sidewalls of the recessed portion can be regarded as a lower portion of the sidewalls of the opening 124.

A contact etch stop layer 116 is blanket deposited over the gate element 105a and the outer portion of the gate element 105b. In one preferred embodiment, the material of the contact etch stop layer 116 is silicon nitride. In another preferred embodiment of forming the contact etch stop layer 116, the material of contact etch stop layer 116 is nitrogen-doped oxide such as NDC and SiCN, or carbon-doped oxide such as CDO, SiOC, and ODC. The contact etch stop layer 116 is preferably deposited to a thickness of about 100 angstroms to about 1000 angstroms, and more preferably about 300 angstroms. The addition of the contact etch stop layer 116 causes inherent stress in the device. It is known that the stress in the device can enhance the carrier mobility, therefore enhancing the device performance.

A dielectric or insulation layer 118 further covers the circuit component 103 and the outer portion of the gate element 105b. Contact plugs 120 in the dielectric or insulation layer 118 provides contacts between gate/drain/source terminals of the circuit component 103 and a metallization level formed over the dielectric or insulation layer 118. The contact plugs 120 may be formed of standard materials such as copper or tungsten. Since the opening 124 penetrates through the ILD material 122 and into the gate element 105b, the dielectric or insulation layer 118 between the ILD material 122 and the gate element 105b is also penetrated through by the opening 124.

A plurality of inter-level contacts plugs 165 and a plurality of metallization layers 170 are embedded in the plurality of layers of ILD material 122 over the dielectric or insulation layer 118. In some embodiments, the metallization layers 170 and the inter-level contact plugs 165 are comprised of metallic material such as copper, aluminum, or alloys thereof, using known techniques such as damascene, dual damascene, or subtractive metal etching. Although the exemplary embodiments described herein depict five metal layers, this is merely illustrative and it should be understood that the semiconductor device 100 may alternatively be formed with more or fewer metal layers, depending on the application. The plurality of inter-level contacts plugs 165 provides interconnections between the metallization layers 170.

Figure 2:
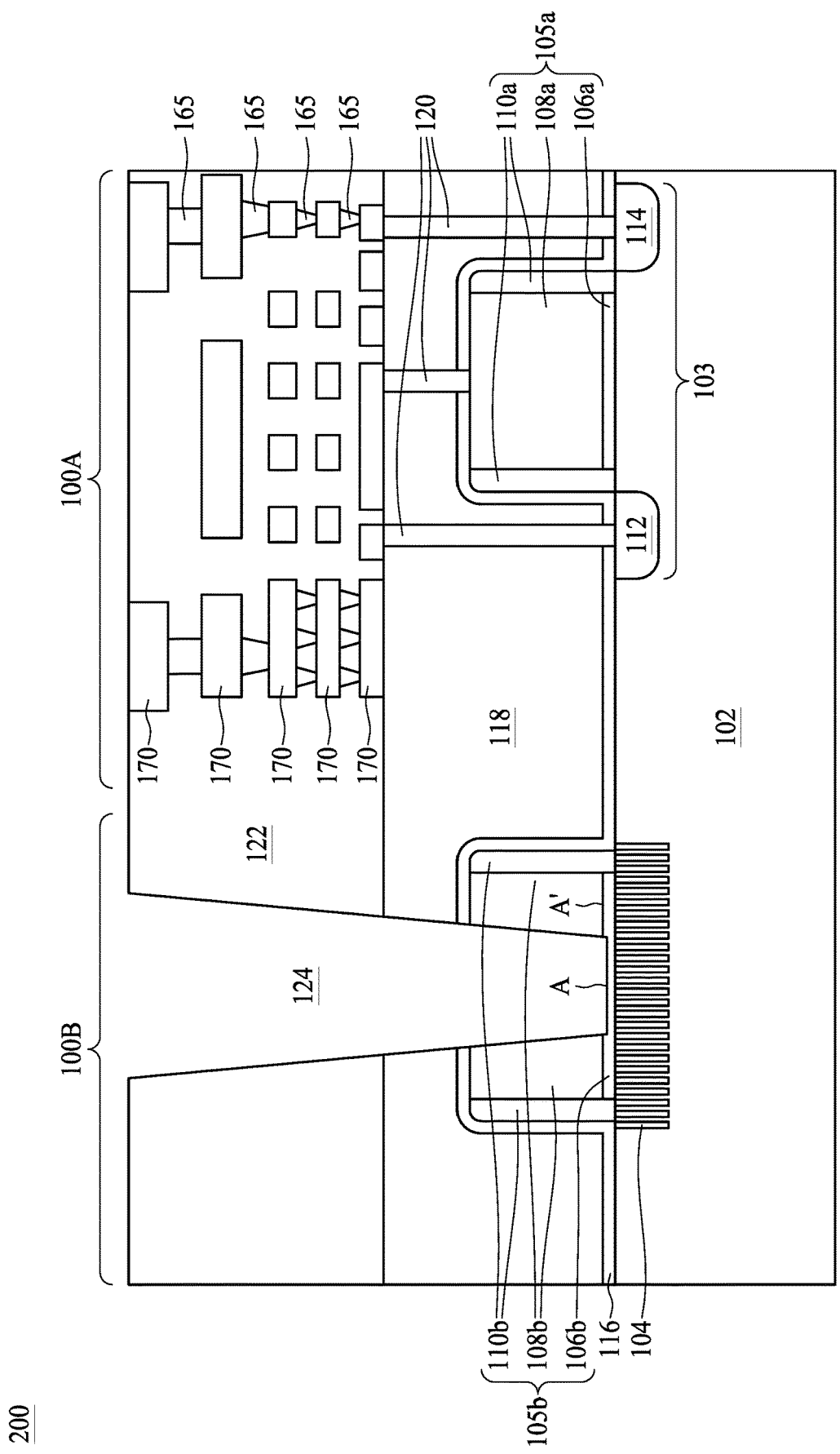
FIG. 2 is a diagrammatic fragmentary cross-sectional view of a semiconductor device in accordance with various embodiments of the present disclosure.

In some embodiments, the opening 124 alternatively has a profile different from rectangular. FIG. 2 is a diagrammatic fragmentary cross-sectional view of a semiconductor device 200 in accordance with various embodiments of the present disclosure. Comparing to the opening 124 of the semiconductor device 100, the opening 124 of the semiconductor device 200 has a tapered profile. A width at a top of the opening 124 of the semiconductor device 200 is wider than the width of the bottom surface A. In particular, two sidewalls of the opening 124 of the semiconductor device 200 are of equal length.

Figure 3:
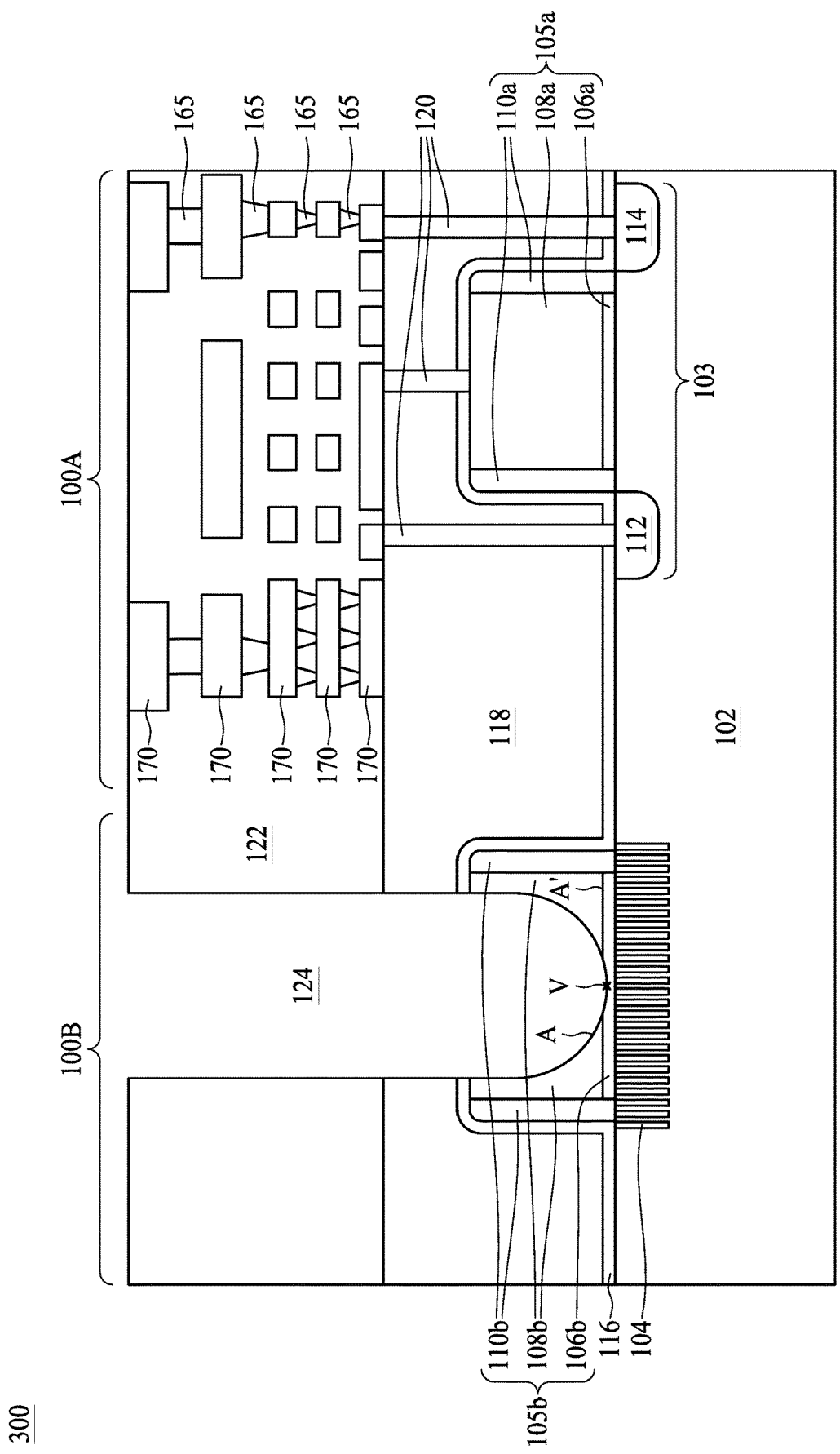
FIG. 3 is a diagrammatic fragmentary cross-sectional view of a semiconductor device in accordance with various embodiments of the present disclosure.

FIG. 3 is a diagrammatic fragmentary cross-sectional view of a semiconductor device 300 in accordance with various embodiments of the present disclosure. The opening 124 of the semiconductor device 300 has a round bottom A. The gate electrode 108b of the semiconductor device 300 includes two profiles having a curved edge respectively abutting the left sidewall and the right sidewall of the opening 124. The gate dielectric 106b is located around the round bottom A of the opening 124. A bottommost vertex V of the round bottom A may be level with or even lower than a bottom surface A' of the gate electrode 108b. In the case where the bottommost vertex V is level with the bottom surface A', the gate dielectric 106b includes a rectangular profile beneath the opening 124, and the gate dielectric 106b is not exposed. FIG. 1 shows the case where the bottommost vertex V is lower than the bottom surface A', the gate dielectric 106b has a rectangular profile with a recessed portion at an upper center of the rectangular profile. The recessed portion of the gate dielectric 106b is exposed through the opening 124. The gate electrode 108b and the gate dielectric 106b together form the bottom surface A of the opening 124.

Figure 4:
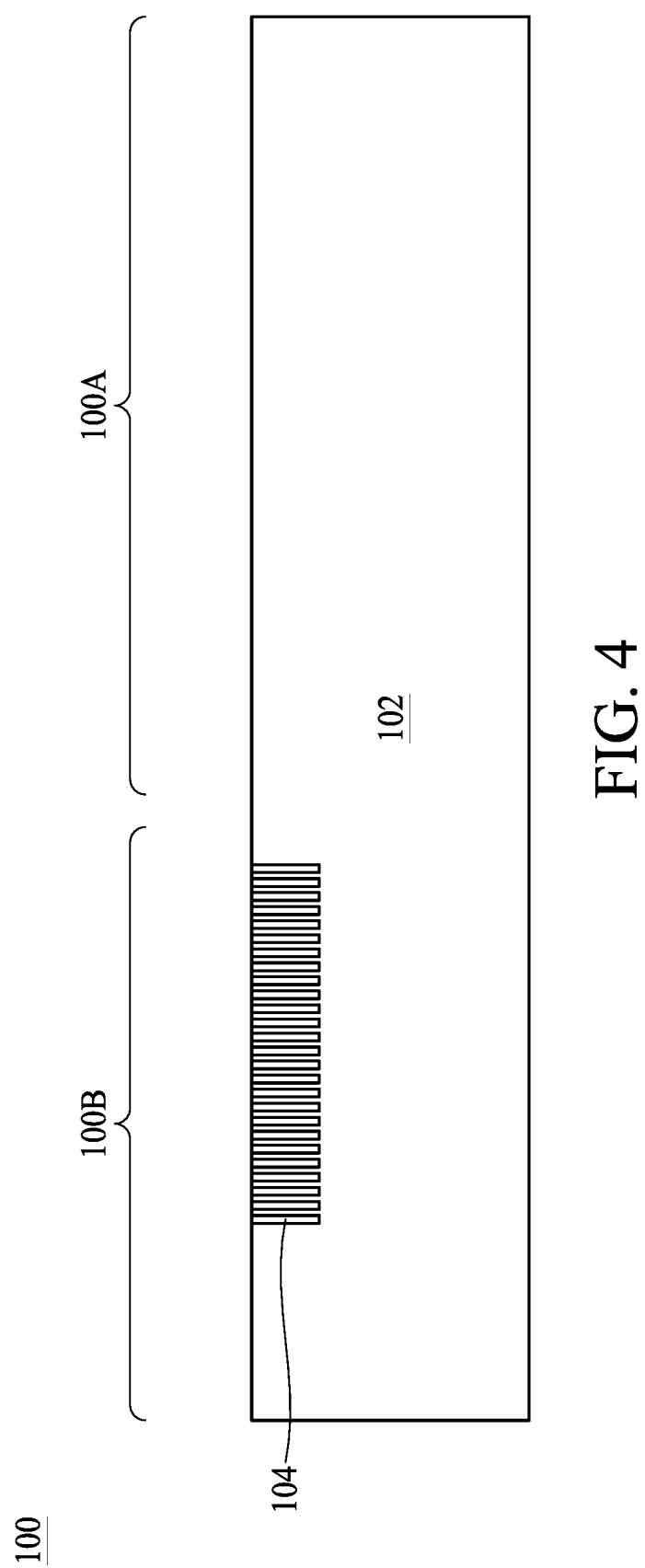
FIG. 4 to FIG. 9 are diagrammatic fragmentary cross-sectional views of the semiconductor device at various stages of its fabrication in accordance with various embodiments of the present disclosure.

FIG. 4 to FIG. 9 are diagrammatic fragmentary cross-sectional views of the semiconductor device 100 at various stages of its fabrication in accordance with various embodiments of the present disclosure. In FIG. 4, the semiconductor substrate 102 is provided. A predetermined area is patterned in the waveguide region 100B of the semiconductor substrate 102, and then metal, such as copper or aluminum, or a high dielectric material can be deposited into the patterned area to form the grating coupler structure 104.

Figure 5:
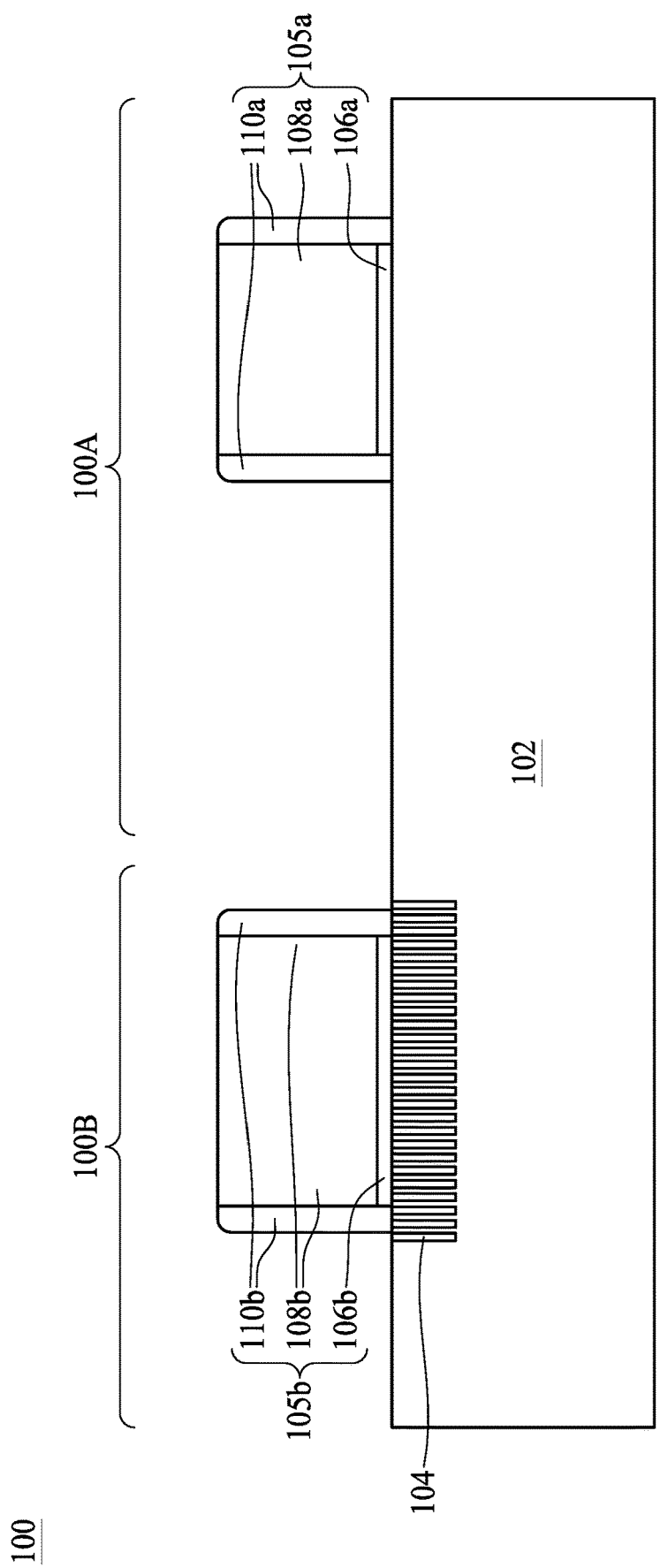

In FIG. 5, a gate dielectric layer is formed on the surface of the semiconductor substrate 102 through any of the known methods, such as local oxidation of silicon (LOCOS), chemical vapor deposition (CVD), etc. The gate dielectric layer may preferably be oxide. In another embodiment, silicon nitride is used since it is an effective barrier to impurity diffusion. The silicon nitride film is preferably formed by thermal nitridation of silicon. It can also be prepared by plasma anodic nitridation using nitrogen-hydrogen. The silicon nitride film may also be formed by thermal nitridation of $SiO_2$. In other embodiments, the gate dielectric layer may also be an oxy-nitride, an oxygen-containing dielectric, a nitrogen-containing dielectric or any combination thereof.

After forming the gate dielectric layer, a gate electrode layer may be formed thereon through chemical vapor deposition (CVD). The gate electrode layer is preferably polysilicon. The polysilicon has the ability of being used as a mask to achieve minimum gate-to-source/drain overlap. This in turn enhances the device performance. The polysilicon is then doped to reduce the sheet resistance. The gate electrode layer and the gate dielectric layer are then patterned to form the gate dielectric 106a and 106b and the gate electrodes 108a and 108b.

Next, the spacers 110a and 110b are formed along sidewalls of the gate electrodes 108a and 108b and the gate dielectric 106a and 106b. The spacers 110a and 110b serve as self-aligning masks for a salicidation process. The spacer material can be oxide, silicon nitride, oxy-nitride or any combination thereof. The spacers 110a and 110b may be formed by well-known methods such as blanket depositing a dielectric layer over the entire region, then anisotropically etching to remove the dielectric layer from horizontal surfaces and leaving the spacers 110a and 110b. In the preferred embodiment, the spacer material can be SiCO based, such as carbon-doped oxide (CDO), carbon incorporated silicon oxide (SiOC) or Ornithine decarboxylase (ODC). In another preferred embodiment, the spacer material can be SiCN based, such as nitrogen-doped silicon carbide (NDC).

Figure 6:
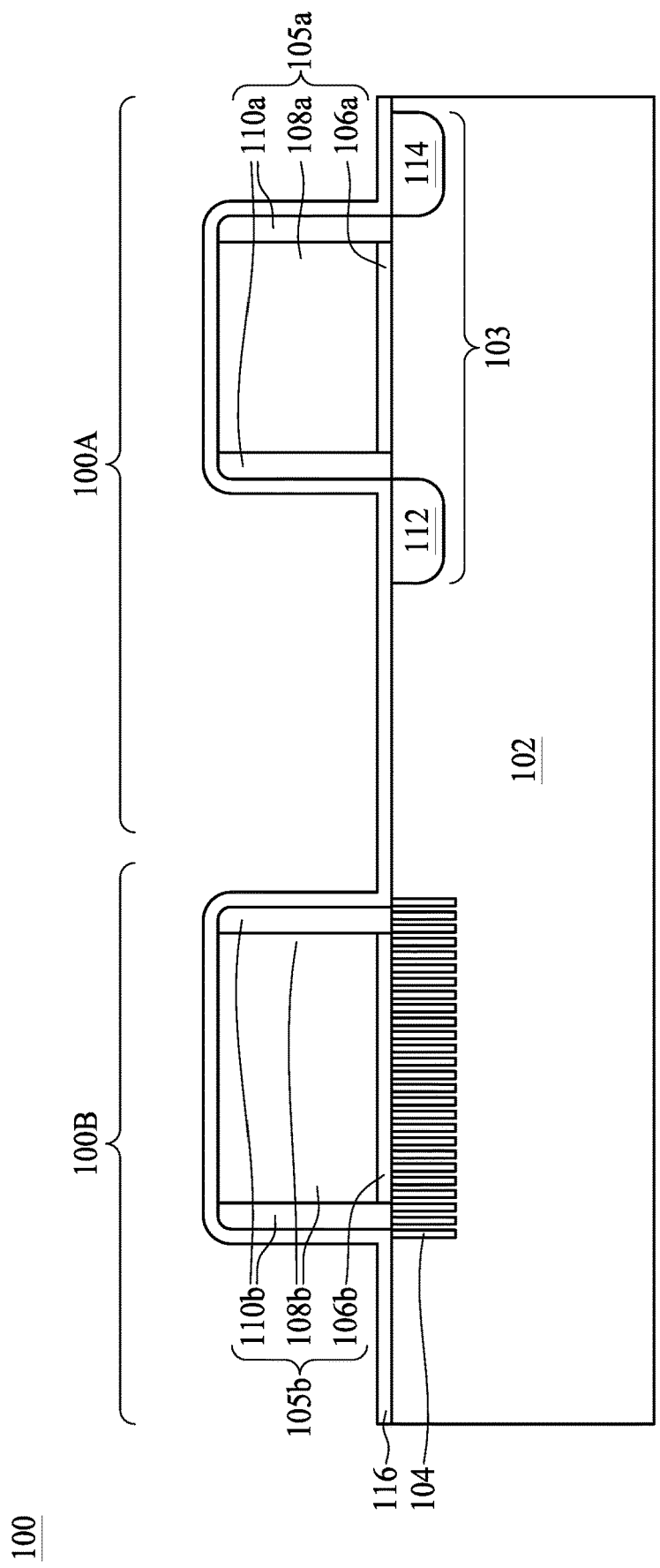

In FIG. 6, the source/drain regions 112 and 114 are epitaxially formed around the gate electrode 108a through molecular beam epitaxy (MBE), chemical vapor deposition (CVD), ultra high vacuum chemical vapor deposition (UHVCVD), atomic layer chemical vapor deposition (ALCVD) or metal organic chemical vapor deposition (MOCVD). In some embodiments, the source/drain regions 112 and 114 may be formed by doping select regions in the logic region 100A of the semiconductor substrate 102. Next, the contact etch stop layer 116 is blanket deposited over the semiconductor substrate 102 by PECVD, or other methods such as ALD or LPCVD.

Figure 7:
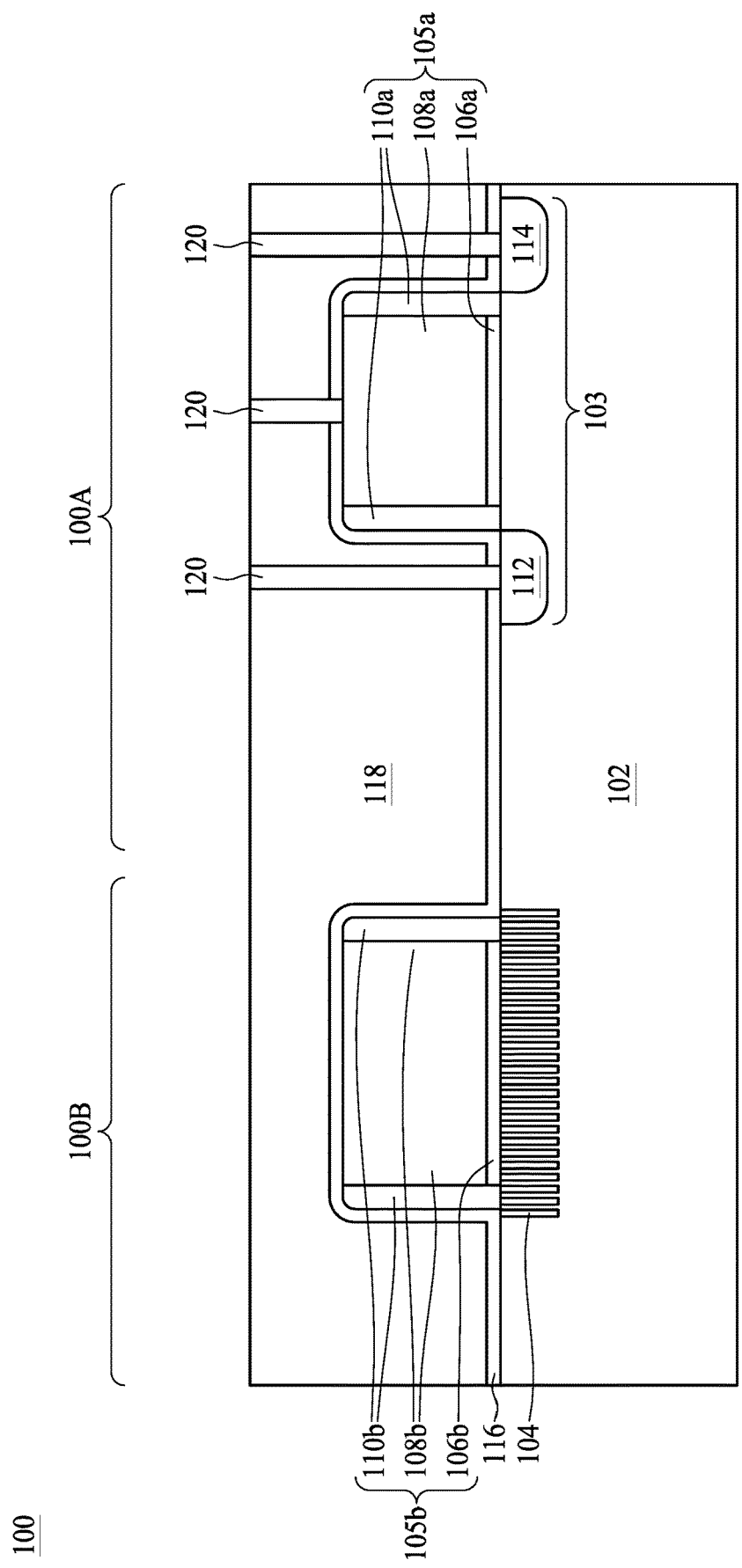

Next, as shown in FIG. 7, the dielectric or insulation layer 118 is deposited on the surface of the contact etch stop layer 116. As known in the art, the dielectric or insulation layer 118 provides insulation between the transistor and the overlying metal lines that are formed subsequently. In some embodiment, the dielectric or insulation layer 118 may be deposited using, e.g., Tetraethyl Orthosilicate (TEOS), CVD, PECVD, LPCVD, or other well-known deposition techniques. After depositing the dielectric or insulation layer 118, the contact plugs 120 are formed to passing through the dielectric or insulation layer 118 and the contact etch stop layer 116 over the gate electrode 108a and the source/drain regions 112 and 114. The contact plugs 120 may be formed of tungsten, aluminum, copper, or other well-known alternatives. The contact plugs 120 may also be composite structures, including, e.g., barrier and adhesion layers, such as titanium/titanium nitride or tantalum nitride, and other layers as well.

Figure 8:
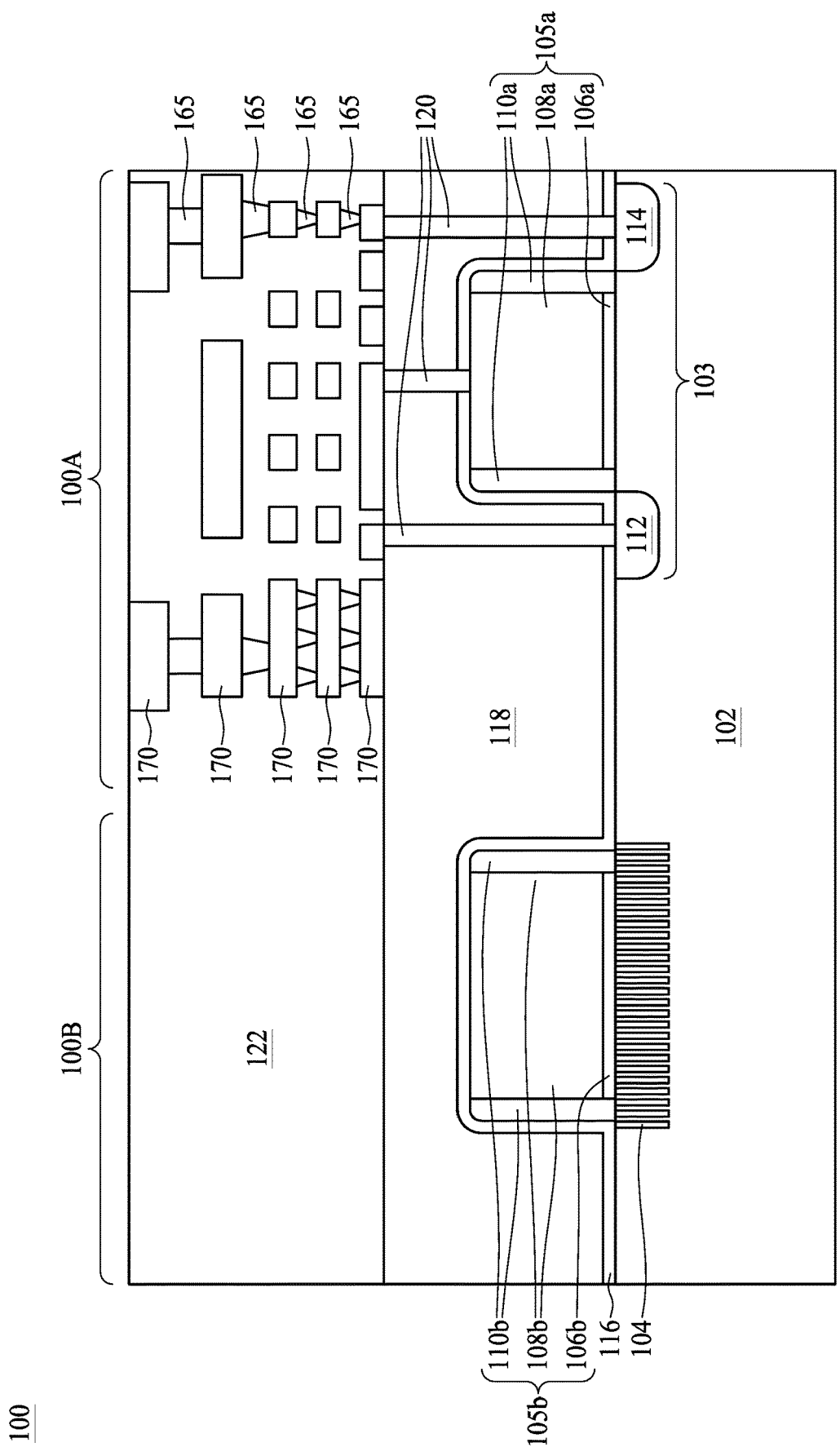

Next, as shown in FIG. 8, The plurality of metallization layers 170 and the plurality of inter-level contact plugs 165 are formed in the plurality of layers of ILD (inter level dielectric) material 122 over the logic region 100A.

Figure 9:
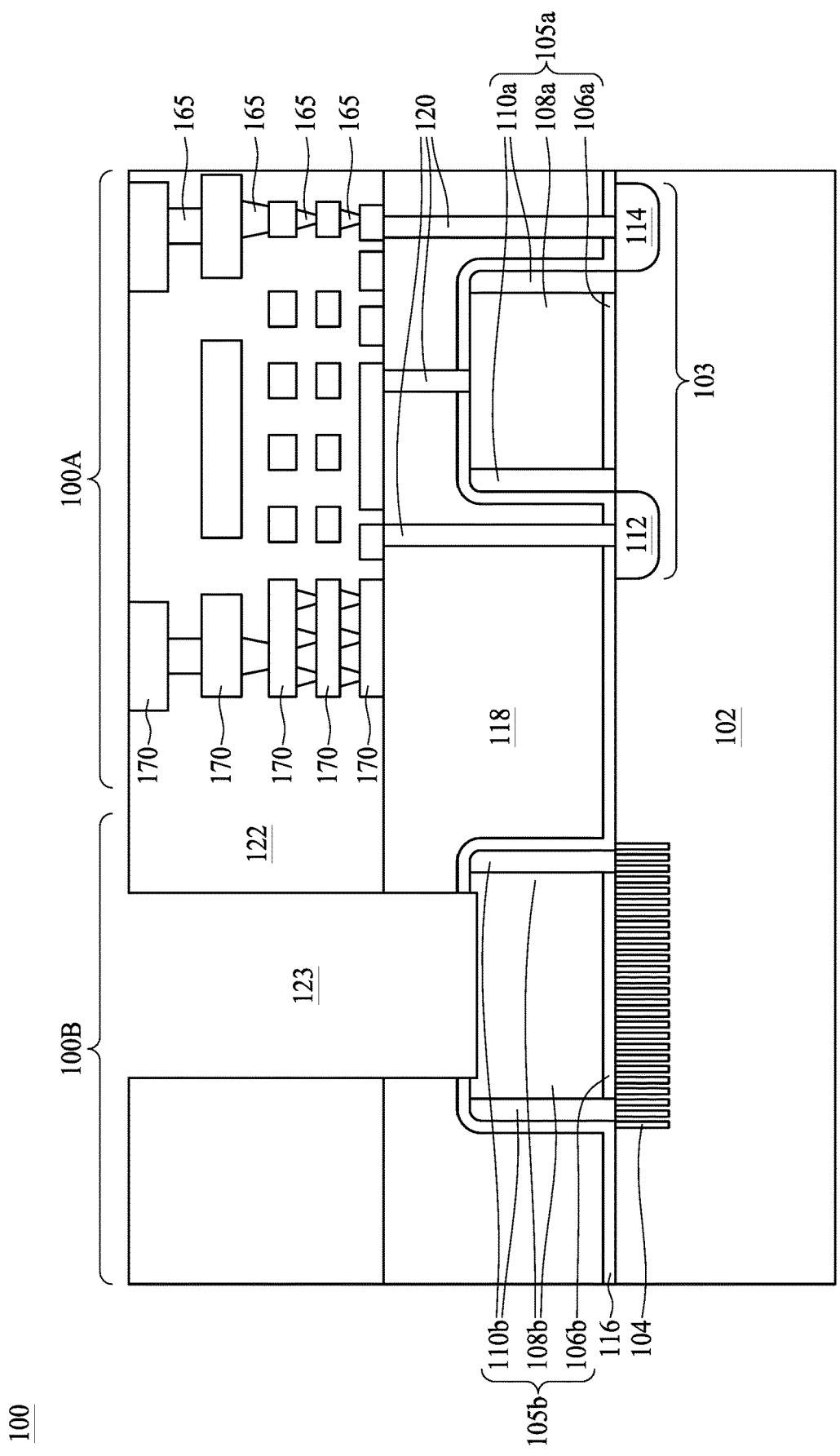

In FIG. 9, a first opening 123 is formed in the ILD material 122 and the contact etch stop layer 116 over the gate electrode 108b at the waveguide region 100B. Forming the first opening 123 is regarded as a first step to obtain the final desired opening 124 as shown in FIG. 1. The first opening 123 is obtained through a first etch process as known in the art. In the exemplary embodiment, the first opening 123 penetrates through the ILD material 122 and the contact etch stop layer 116, and stops at the gate electrode 108b since the contact etch stop layer 116 and the gate electrode 108b are different materials that can be selectively etched. The gate electrode 108b is therefore exposed and in some embodiments, a thin portion of the gate electrode 108b may be over etched.

Finally, a second etch process is performed upon the first opening 123 to obtain the desired opening 124 as shown in FIG. 1. In the exemplary embodiment, the second etch process further extends the opening 123 to penetrate through the gate electrode 108b and stops at the gate dielectric 106b since the gate electrode 108b and the gate dielectric 106b are different materials that can be selectively etched. The high selectivity between polysilicon of the gate electrode 108b and oxide of the gate dielectric 106b is advantageous for profile control of the final opening 124 to have an even and smooth bottom surface. Since the opening 124 may be used as a light path or waveguide to introduce light to the underneath grating coupler structure 104, a rough and uneven bottom surface is undesirable for the bottom surface of the opening 124 with regard to light absorption.

Some embodiments of the present disclosure provide a semiconductor structure, including: a substrate; and a gate element over the substrate, the gate element including: a gate dielectric layer over the substrate; a gate electrode over the gate dielectric layer; and a waveguide passing through the gate electrode from a top surface of the gate electrode to a bottom surface of the gate electrode.

Some embodiments of the present disclosure provide a semiconductor structure. The semiconductor structure includes: a substrate; a grating coupler structure in the substrate; and a waveguide over the grating coupler; and wherein a sidewall of the waveguide is encompassed by a gate element.

Some embodiments of the present disclosure provide a method for manufacturing a semiconductor structure. The method includes: providing a semiconductor substrate; forming a gate element over the semiconductor substrate, the gate element including a gate dielectric layer and a gate electrode over the gate dielectric layer; forming an inter level dielectric (ILD) material over the gate element; performing a first etch to form an opening penetrating through the ILD material and stopping at the gate electrode; and performing a second etch to expand the opening to penetrate through the gate electrode and stop at the gate dielectric layer.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A semiconductor structure, comprising:
a gate element, the gate element including:
a gate dielectric layer; and
a gate electrode over the gate dielectric layer;
an insulation layer over and covering a top surface and sidewalls of the gate element, and a bottom of the insulation layer is coplanar with a bottom of the gate element; and
a waveguide passing the insulation layer and further passing through the gate electrode from a top surface of the gate electrode to a bottom surface of the gate electrode, and further extending into the gate dielectric layer without passing through the gate dielectric layer.

2. The semiconductor structure of claim 1, wherein the waveguide is filled with air, and the insulation layer and the gate element are exposed to the air through sidewall of the waveguide.

3. The semiconductor structure of claim 1, further comprising a pair of spacers formed along sidewalls of the gate dielectric layer and the gate electrode.

4. The semiconductor structure of claim 1, further comprising a contact etch stop layer covering a top surface of the gate electrode.

5. The semiconductor structure of claim 1, wherein the gate electrode includes polysilicon.

6. The semiconductor structure of claim 1, wherein the waveguide has a tapered structure.

7. The semiconductor structure of claim 1, wherein the waveguide has a round bottom.

8. A semiconductor structure, comprising:
a substrate;
an insulation layer over the substrate; and
a waveguide over the substrate; and wherein a sidewall of the waveguide is encompassed by a gate element and the insulation layer, and the gate element includes a gate dielectric layer, a gate electrode and a pair of spacers along sidewalls of the gate dielectric layer and the gate electrode, wherein the insulation layer covers a top surface and sidewalls of the gate element, and a bottom of the insulation layer is coplanar with a bottom of the gate element, and the gate dielectric layer includes a recessed region, and the waveguide fills the recessed region, and the waveguide is separated from the substrate by the gate dielectric layer.

9. The semiconductor structure of claim 8, wherein the waveguide is filled with air, and the insulation layer and the gate element are exposed to the air through sidewall of the waveguide.

10. The semiconductor structure of claim 8, wherein the gate dielectric layer is over the substrate, the gate electrode is over the gate dielectric layer, and a silicon nitride layer is over the gate electrode.

11. The semiconductor structure of claim 10, wherein the sidewall of the waveguide is encompassed by the gate electrode of the gate element.

12. The semiconductor structure of claim 11, wherein the sidewall of the waveguide is further encompassed by the silicon nitride layer of the gate element.

13. The semiconductor structure of claim 10, wherein a width of a bottom surface of the waveguide is narrower than a width of the gate dielectric layer.

14. The semiconductor structure of claim 10, wherein the gate electrode includes polysilicon.

15. The semiconductor structure of claim 8, further comprising an inter level dielectric (ILD) material including a metallization layer over the substrate.

16. The semiconductor structure of claim 15, wherein the waveguide is further encompassed by the ILD material.

17. A semiconductor structure, comprising:
a gate element over a grating coupler for coupling a laser signal, wherein the gate element includes:
a gate dielectric layer; and
a gate electrode over the gate dielectric layer;
an insulation layer over and covering a top surface and sidewalls of the gate element, and a bottom of the insulation layer is coplanar with a bottom of the gate element; and
a cavity allowing the laser signal passing through the insulation layer and the gate electrode from a top surface of the gate electrode to a bottom surface of the gate electrode, and the cavity further extending into the gate dielectric layer without passing through the gate dielectric layer.

18. The semiconductor structure of claim 17, further comprising a pair of spacers formed along sidewalls of the gate dielectric layer and the gate electrode.

19. The semiconductor structure of claim 17, wherein the cavity has a tapered structure.

20. The semiconductor structure of claim 17, wherein the cavity has a round bottom.

* * * * *